(12) United States Patent
Kissick

(10) Patent No.: US 7,971,778 B2
(45) Date of Patent: Jul. 5, 2011

(54) TRANSACTION DATA CAPTURE SYSTEM AND METHOD THEREFOR

(76) Inventor: Alan Kissick, Falls Church, VA (US)

( * ) Notice: Subject to any disclaimer, the term of this patent is extended or adjusted under 35 U.S.C. 154(b) by 900 days.

(21) Appl. No.: 11/709,561

(22) Filed: Feb. 22, 2007

(65) Prior Publication Data

US 2007/0194105 A1 Aug. 23, 2007

Related U.S. Application Data

(60) Provisional application No. 60/775,452, filed on Feb. 22, 2006.

(51) Int. Cl.
*G06Q 40/00* (2006.01)
*G07D 11/00* (2006.01)
*G07F 19/00* (2006.01)
(52) U.S. Cl. ........................................ 235/379; 235/375
(58) Field of Classification Search .................. 235/379, 235/380, 375, 472.01, 472.02
See application file for complete search history.

(56) References Cited

U.S. PATENT DOCUMENTS

2006/0029296 A1* 2/2006 King et al. .................... 382/313

OTHER PUBLICATIONS

S Dumenco, Paperweight lifted, Article-New York Magazine, Dec. 29, 2005, Best Bets Daily.

* cited by examiner

*Primary Examiner* — Edwyn Labaze
(74) *Attorney, Agent, or Firm* — The Marbury Law Group, PLLC

(57) ABSTRACT

A transaction data capture system comprises a data capture interface, a portable data capture module (herein, the "PDCM"), and a data transfer interface. Transaction data from an electronic transaction device that would normally be directed to a paper printer is sent to the data capture interface and written to the PDCM. A data transfer interface formats the captured and stored transaction data for import into a software application operating on a computing device. The software application is selectable by a user of the computing device.

30 Claims, 3 Drawing Sheets

TRANSACTION DATA CAPTURE SYSTEM AND METHOD THEREFOR

CROSS-REFERENCE TO RELATED APPLICATIONS

This application claims the benefit of U.S. Provisional Application Ser. No. 60/775,452, filed on Feb. 22, 2006, which is hereby incorporated by reference for all purposes.

BACKGROUND

Embodiments of the present invention are directed to capturing data related to the purchase of goods and services, either at a retail "brick-and-mortar" establishment or "online" over a network, and data relating to a financial transaction at a bank or ATM machine.

Modern commerce, be it a consumer purchase of goods, a commercial transaction, or a bank transaction, relies heavily on computers. Computerized cash registers record transaction data from both cash and credit transactions. Banks use computer systems to manage deposit and withdrawals to bank accounts. ATM machines provide connectivity between a remote computer and a central bank computer over worldwide networks. Despite the computerization of commerce, however, participants to such transactions almost always receive transaction data in the form of a paper receipt.

Paper receipts provide a written record of a transaction. A typical purchase receipt will indicate the date and time of the transaction, the items purchased, the price of each item, the sales tax paid, the amount tendered, and the change provided. Receipts of this type may also include line item details of the items purchased, such as, by way of example and not as a limitation, a SKU number, a serial number, model number, a store number, a sales person identifier, and other identifying information. Bank transaction receipts typically convey account information such as account number, account balance, a location identifier where the transaction was consummated, and a timestamp indicating when the transaction was completed.

The information on a paper receipt, while useful, cannot be captured into a financial data storage system without manual transcription or scanning. Additionally, the paper receipt is routinely discarded. The information on a receipt may be used by unscrupulous third parities to obtain personal information about a transaction participant and may facilitate identity theft.

What would be useful is system and method for capturing transaction data that would provide a participant in a transaction access to the transaction data in electronic form.

SUMMARY

In an embodiment of the present invention, a transaction data capture system comprises a data capture interface, a portable data capture module (herein, the "PDCM"), and a data transfer interface. Transaction data from an electronic transaction device that would normally be directed to a paper printer is sent to the data capture interface. By way of illustration and not as a limitation, an electronic transaction device may be a cash register, a computer, a credit card transaction device, a debit card transaction device, a bank teller terminal, an ATM machine, or a smart card transaction device. By way of illustration and not as a limitation, a portable data capture module may be a flash memory card (Compact Flash, SmartMedia, MMC, Secure Digital, Memory Stick and xD-Picture Cards and derivatives and extensions thereof, such as RS-MMC, MMC+, MS Pro, MS Duo, TransFlash, miniSD, microSD, SDHC, etc.), a USB flash memory drive (i.e., flash drive, ThumbDrive, JumpDrive, DiskOnKey, etc.), USB or Firewire memory stick readers, and microdrives, portable hard drives (Firewire or USB pocket drives), solid state disks (SSD), PDAs (i.e., Palm Treo, RIM BlackBerry, Apple iPhone, T-Mobile Sidekick, etc.), mobile telephones (i.e., cellphone, smart phone, etc.), handheld game devices (e.g., Sony PS2, Nintendo DS, etc.), palm-top computers, tablet computers, and laptop computers.

According to one embodiment of the present invention, the data capture interface comprises a port for connecting to the PDCM, a port for receiving the transaction data from an electronic transaction device, and data capture software that writes the transaction data to the PDCM. The data transfer interface comprises a port for connecting to the PDCM, a port for connecting to a computing device, and data transfer software that writes the transaction data from the PDCM to the computing device. The transaction data is accessible to the computing device for storage and processing. By way of illustration and not as a limitation, a computing device may be a desktop computer, a tablet computer, a laptop computer, a personal data assistant, or a cell phone.

In another embodiment of the present invention, the data capture software comprises a data capture driver for the computing device that defines the transaction data label-value pairs (herein, "LVPs") generated by the electronic transaction device and how the values associated with the LVPs are formatted. The data capture software driver writes these LVPs to the PDCM in a manner that can be read by the data transfer software.

In still another embodiment of the present invention, the data transfer software comprises a transfer driver that presents the transaction data to the computing device in a form that can be received by a software application selected by a user of the transaction data capture system.

As will be appreciated by those skilled in the art, the data capture interface, the PDCM, and the data transfer interface may be provided as distinct modules or may be variously integrated with other devices without departing from the scope of the present invention. By way of illustration and not as a limitation, the data capture interface may be implemented in an electronic transaction device or in the PDCM. By way of illustration and not as a limitation, the data transfer interface may be implemented in a computing device or in the PDCM.

In certain embodiments, the merchant or retailer can obtain the additional benefit of obtaining basic demographic information related to the transaction data based upon the PDCM used. Either the PDCM could store basic user demographic information that is accessible to the electronic transaction device or data transfer interface, or an ID associated with the PDCM can be registered by the user with the merchant or retailer that allows subsequent matching of the transaction data to the demographics of the PDCM user in a manner that protects the user's privacy.

It is therefore an aspect of the present invention to capture transaction data from an electronic transaction device on a PDCM.

It is yet another aspect of the present invention to transfer captured transaction data from a PDCM to a computing device for storage and/or processing.

It is still another aspect of the present invention to provide captured transaction data to the computing device in a form that is importable by an application selected by a user of the computing device.

It is an aspect of the present invention to reduce, if not eliminate, the need for paper transaction receipts.

It is a further aspect of the present invention to provide merchants or retailers with demographic information related to the transaction data based upon PDCM identification.

These and other aspects of the present invention will be apparent from the general and detail descriptions that follow.

In an embodiment of the present invention, a transaction data capture system comprises a data capture interface, a portable data capture module (herein, the "PDCM") comprising a memory, and a data transfer interface. The data capture interface is linked to the PDCM. The data capture interface is linked to an electronic transaction device, receives transaction data from the electronic transaction device, translates the transaction data into a format readable by the transfer interface, and stores the transaction data in the memory of the PDCM.

In an embodiment of the present invention, the connection between the data capture interface and the electronic transaction device and the connection between the data transfer interface and the computing device are established over USB ports. However, this is not meant as a limitation. As will be appreciate by those skilled in the art, the connection between the data capture interface and the electronic transaction device and the connection between the data transfer interface and the computing device may be established by other means, both wired and wireless, without departing from the scope of the present invention.

In another embodiment of the present invention, the data capture interface is integrated into the electronic transaction device. In still another embodiment of the present invention, the data transfer interface is integrated into the computing device. In yet another embodiment of the present invention, the data capture interface and the data transfer interface are integrated into the PDCM.

The transfer interface is linked to the PDCM and receives a transfer command from a computing device. In response to the transfer command, the transfer interface processes the transaction data and transfers the transaction data from the memory of the PDCM to the computing device. By way of illustration and not as a limitation, the electronic transaction device may be a cash register, a computer, a credit card transaction device, a debit card transaction device, or a smart card transaction device. By way of illustration and not as a limitation, the PDCM may be a flash memory card, flash drive, portable hard drive, solid state disk, personal digital assistant (PDA), portable gaming device, mobile telephone device, or mobile computer. By way of illustration and not as a limitation, the computing device may be a desktop computer, a tablet computer, a laptop computer, a personal data assistant, or a cell phone. By way of illustration and not as a limitation, the transaction data may be a cash register transaction, a computer transaction, a credit card transaction, a debit card transaction, a smart card transaction, or a banking transaction.

DETAILED DESCRIPTION

In an embodiment of the present invention, a transaction data capture system comprises a data capture interface, a portable data capture module (herein, the "PDCM"), and a data transfer interface. Transaction data from an electronic transaction device that would normally be directed to a paper printer is sent to the data capture interface. By way of illustration and not as a limitation, an electronic transaction device may be a cash register, a computer, a credit card transaction device, a debit card transaction device, or a smart card transaction device. By way of illustration and not as a limitation, a portable data capture module may be a flash memory, an SD memory, a memory stick, and a micro-drive.

Figure 1:
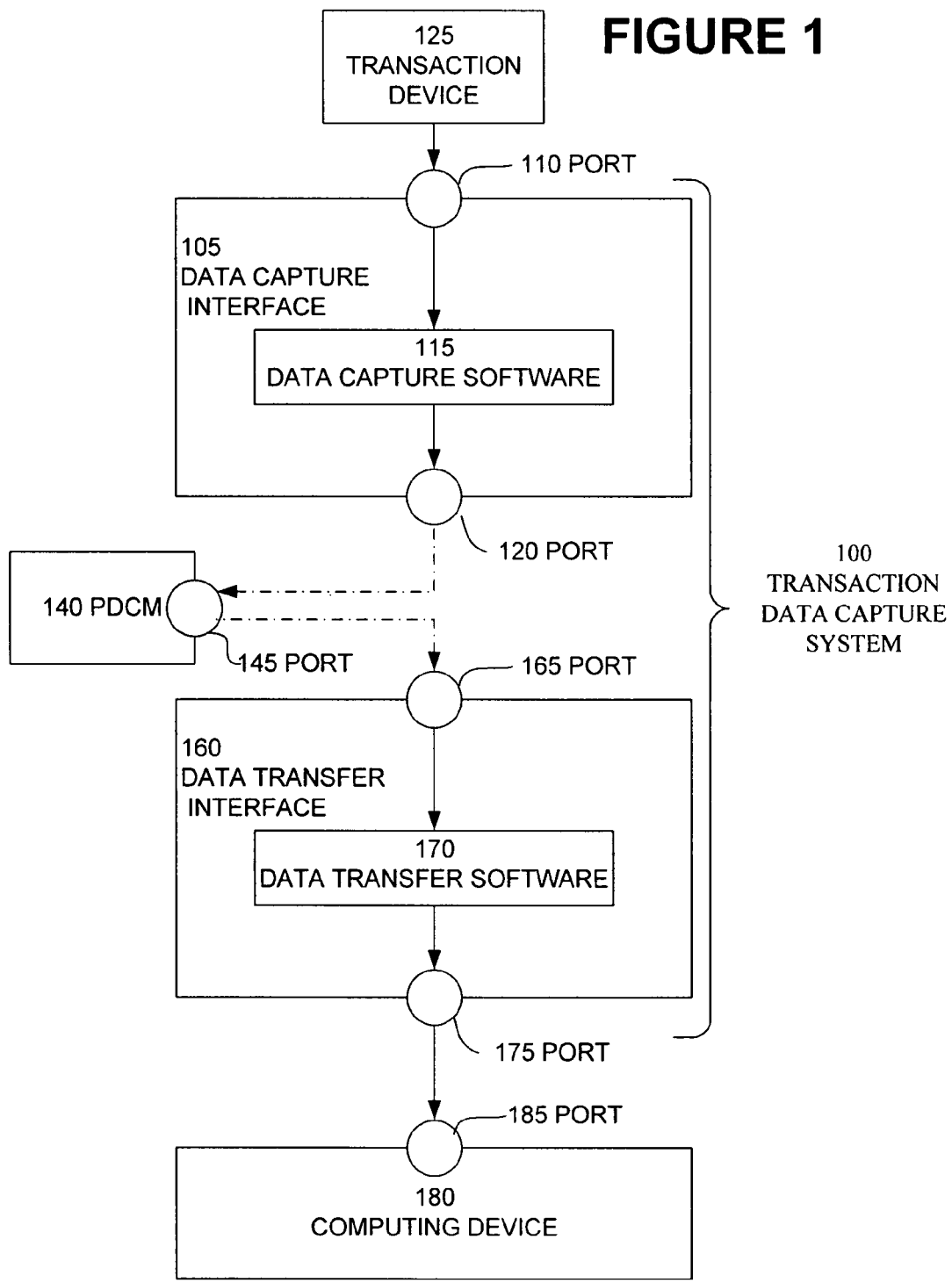
FIG. 1 illustrates a transaction data capture system according to an embodiment of the present invention.

FIG. 1 illustrates a transaction data capture system according to an embodiment of the present invention.

Transaction data capture system 100 comprises a data capture interface 105, a portable data capture module (herein, the "PDCM") 140, and a data transfer interface 160. The data capture interface 105 comprises a port 110 for connecting to an electronic transaction device 125, data capture software 115 that receives transaction data from the electronic transaction device 125 and writes the transaction data to the PDCM 140, and a port 120 for connecting to the PDCM 140.

The data transfer interface 160 comprises a port 165 for connecting to the PDCM 140, a port 175 for connecting to a computing device 180 through port 185 on computing device 180, and data transfer software 170 that writes the transaction data from the PDCM to the computing device 180. The transaction data is accessible to the computing device 180 for storage and processing. By way of illustration and not as a limitation, a computing device 180 may be a desktop computer, a tablet computer, a laptop computer, a personal data assistant, or other portable computing device.

In another embodiment of the present invention, the data capture software 115 comprises a data capture driver that is compatible with the electronic transaction device. The data capture driver defines the transaction data label-value pairs (herein, "LVPs") generated by the electronic transaction device and how the values associated with the LVPs are formatted. The data capture software driver writes these LVPs to the PDCM in a manner that can be read by the data transfer software 170. In an embodiment of the present invention, the data capture driver emulates a printer driver that is compatible with a receipt printer. In this embodiment, the transaction data capture system can be implemented with minimal changes to existing transaction devices and transaction systems.

In still another embodiment of the present invention, the data transfer software 170 comprises a transfer driver that reads the transaction data from the PDCM and processes the transaction data for the computing device 180 in a form that can be received by a software application selected by a user of the transaction data capture system 100.

In an exemplary embodiment of the present invention, PDCM 140 comprises a portable memory device and ports 145, 120, 165, 175 and 185 are USB ports. However, this is not meant as a limitation. As will be appreciated by those skilled in the art, the connections describe herein may be established over wired or wireless connections without departing from scope of the present invention. By way of illustration and not as a limitation, ports 145, 120, 165, 175 and 185 may be wireless ports supporting a spread spectrum signal, an 802.11 signal, or a Bluetooth signal.

Figure 2:
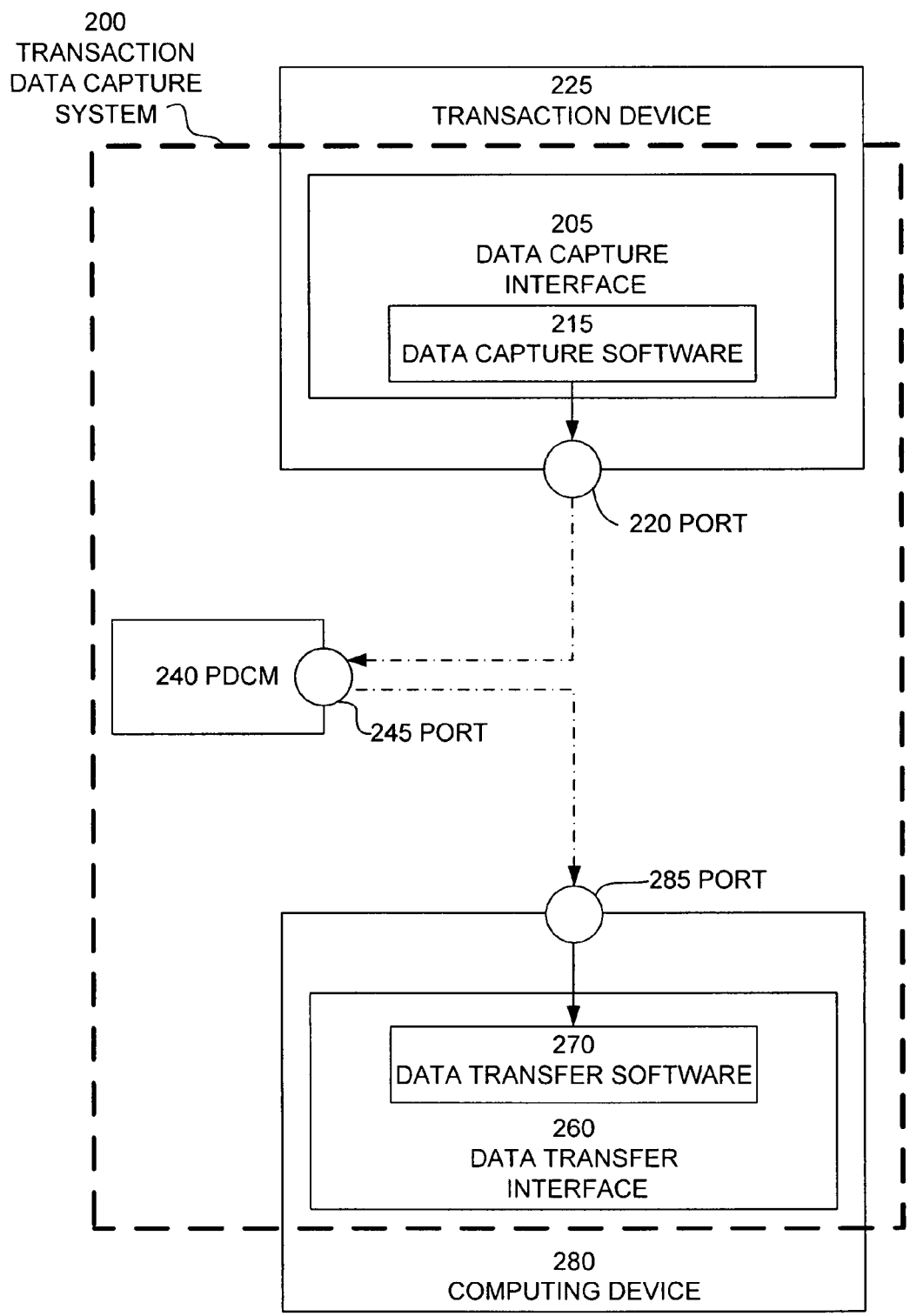
FIG. 2 illustrates a transaction data capture system according to an alternative embodiment of the present invention.

FIG. 2 illustrates a transaction data capture system according to an alternative embodiment of the present invention. In this embodiment, the interface components have been integrated with an electronic transaction device and a computing device.

Transaction data capture system 200 comprises a data capture interface 205, a portable data capture module (herein, the "PDCM") 240, and a data transfer interface 260. The data capture interface 205 is integrated into an electronic transaction device 225. The data capture interface 205 comprises data capture software 215 that receives transaction data from the electronic transaction device 225 and writes the transaction data to the PDCM 240. The data capture interface communicates with the PDCM 240 through transaction device port 220.

The data transfer interface 260 is integrated with a computing device 280 and comprises data transfer software 270 that writes the transaction data from the PDCM to the computing device 280. The computing device 280 communicates with the data transfer interface 260 through computing device port 285. The transaction data is accessible to the computing device 280 for storage and processing. By way of illustration and not as a limitation, a computing device 280 may be a desktop computer, a tablet computer, a laptop computer, a personal data assistant, or other portable computing device.

In another embodiment of the present invention, the data capture software 215 comprises a data capture driver that is compatible with the electronic transaction device. The data capture driver defines the transaction data label-value pairs (herein, "LVPs") generated by the electronic transaction device and how the values associated with the LVPs are formatted. The data capture software driver writes these LVPs to the PDCM in a manner that can be read by the data transfer software 270. In an embodiment of the present invention, the data capture driver emulates a printer driver that is compatible with a receipt printer. In this embodiment, the transaction data capture system can be implemented with minimal changes to existing transaction devices and transaction systems.

In still another embodiment of the present invention, the data transfer software 270 comprises a transfer driver that reads the transaction data from the PDCM and processes the transaction data for the computing device 280 in a form that can be received by a software application selected by a user of the transaction data capture system 200.

In an exemplary embodiment of the present invention, PDCM 240 comprises a portable memory device and ports 245, 220, and 285 are USB ports. However, this is not meant as a limitation. As will be appreciated by those skilled in the art, the connections describe herein may be established over wired or wireless connections without departing from scope of the present invention. By way of illustration and not as a limitation, ports 245, 220, and 285 may be wireless ports supporting a spread spectrum signal, an 802.11 signal, or a Bluetooth signal.

Figure 3:
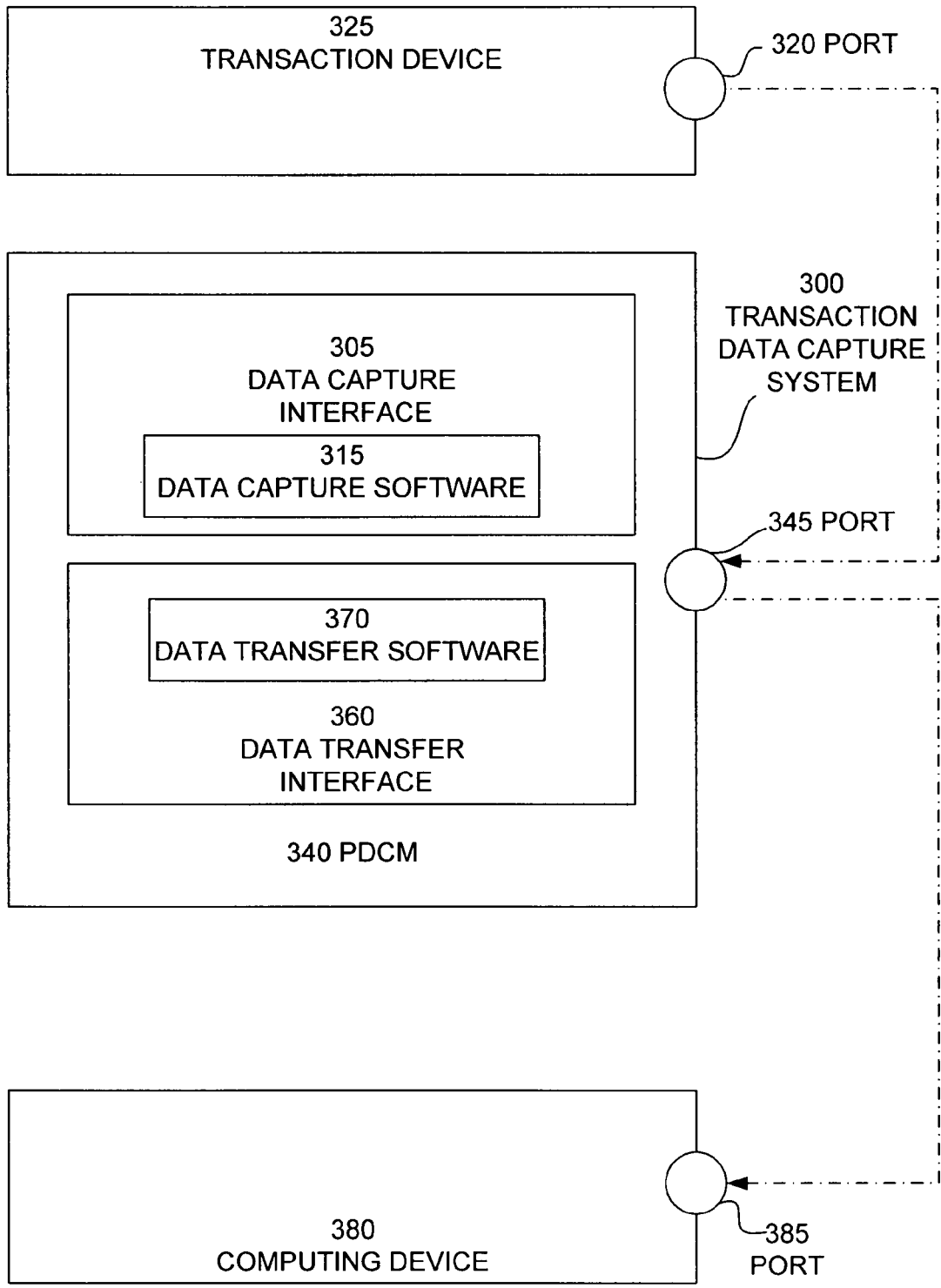
FIG. 3 illustrates a transaction data capture system according to another embodiment of the present invention.

FIG. 3 illustrates a transaction data capture system according to another embodiment of the present invention. In this embodiment, the interface components have been integrated with an electronic transaction device and a computing device.

Transaction data capture system 300 comprises a data capture interface 305, a portable data capture module (herein, the "PDCM") 340, and a data transfer interface 360. The data capture interface 305 and the data transfer interface 360 are integrated into PDCM 340. The data capture interface 305 comprises data capture software 315 that receives transaction data from the electronic transaction device 325 and writes the transaction data to the PDCM 340. The data capture interface 305 communicates with transaction device 325 through PDCM port 345 and transaction device port 320.

The data transfer interface 360 comprises data transfer software 370 that writes the transaction data from the PDCM to the computing device 380. The computing device 380 communicates with data transfer interface 360 through PDCM port 345 and computing device port 385.

The transaction data is accessible to the computing device 380 for storage and processing. By way of illustration and not as a limitation, a computing device 380 may be a desktop computer, a tablet computer, a laptop computer, a personal data assistant, or other portable computing device.

In another embodiment of the present invention, the data capture software 315 comprises a data capture driver that is compatible with the electronic transaction device. The data capture driver defines the transaction data label-value pairs (herein, "LVPs") generated by the electronic transaction device and how the values associated with the LVPs are formatted. The data capture software driver writes these LVPs to the PDCM in a manner that can be read by the data transfer software 370. In an embodiment of the present invention, the data capture driver emulates a printer driver that is compatible with a receipt printer. In this embodiment, the transaction data capture system can be implemented with minimal changes to existing transaction devices and transaction systems.

In still another embodiment of the present invention, the data transfer software 370 comprises a transfer driver that reads the transaction data from the PDCM and processes the transaction data for the computing device 380 in a form that can be received by a software application selected by a user of the transaction data capture system 300.

In an exemplary embodiment of the present invention, PDCM 340 comprises a portable memory device and ports 345, 320, and 385 are USB ports. However, this is not meant as a limitation. As will be appreciated by those skilled in the art, the connections describe herein may be established over wired or wireless connections without departing from scope of the present invention. By way of illustration and not as a limitation, ports 345, 320, and 385 may be wireless ports supporting a spread spectrum signal, an 802.11 signal, or a Bluetooth signal.

A basic embodiment of the invention is a transaction data capture system having a data capture interface, a portable data capture module (herein, the "PDCM") comprising a memory, and a data transfer interface, wherein the data capture interface is linked to the PDCM and is adapted for: connecting to an electronic transaction device; receiving transaction data from the electronic transaction device; translating the transaction data into a format readable by the transfer interface; and storing the transaction data in the memory of the PDCM; and wherein the transfer interface is linked to the PDCM and is adapted for: connecting to a computing device; receiving a transfer command from a computing device; processing the transaction data for transfer to the computing device in response to the transfer command; and transferring the transaction data from the memory of the PDCM to the computing device.

Optional variations on the system include those wherein the electronic transaction device is selected from the group consisting of a cash register, a computer, a credit card transaction device, a debit card transaction device, a smart card transaction device, a bank teller terminal and an automated teller machine (ATM). Similarly, the PDCM can be selected from the group consisting of flash memory cards, flash drives, portable hard drives, solid state disks, personal digital assistants (PDAs), portable gaming devices, mobile telephone devices, and mobile computers. The computing device can be selected from the group consisting of a desktop computer, a tablet computer, a tablet computer, a laptop computer, a personal data assistant, and a mobile telephone device. The transaction data can optionally be selected from the group consisting of a cash register transaction, a computer transaction, a credit card transaction, a debit card transaction, a smart card transaction, and a banking transaction.

The system can use various means for the connection between the data capture interface and the electronic transaction device and the connection between the data transfer interface and the computing device, including a wired connection, such as over a USB port, a wireless connection, such as a spread spectrum connection, a Blue-Tooth connection, or an 802.11 connection. The data capture interface can be integrated into the electronic transaction device or integrated into the computing device. Similarly, both the data capture interface and the data transfer interface can be integrated into the PDCM.

A basic method of the present invention includes capturing transaction data from an electronic transaction device by receiving transaction data from the electronic transaction device at a data capture interface, translating the transaction data into a format readable by a data transfer interface, storing the transaction data in a memory of a portable data capture module, receiving a transfer command from a computing device, processing the transaction data at the data transfer interface for transfer to the computing device in response to the transfer command, and transferring the processed transaction data from the memory of the PDCM to the computing device.

Variations on the basic method include those wherein the electronic transaction device is selected from the group consisting of a cash register, a computer, a credit card transaction device, a debit card transaction device, a smart card transaction device, a bank teller terminal, and an automated teller machine (ATM). Other variations on the basic method include those wherein the PDCM is selected from the group consisting of flash memory cards, flash drives, portable hard drives, solid state disks, personal digital assistants (PDAs), portable gaming devices, mobile telephone devices, and mobile computers.

In operation, the method can use a computing device selected from the group consisting of a desktop computer, a tablet computer, a tablet computer, a laptop computer, a personal data assistant, and a mobile telephone device, and the transaction data can optionally be selected from the group consisting of a cash register transaction, a computer transaction, a credit card transaction, a debit card transaction, a smart card transaction, and a banking transaction.

The method can use various connection types between the data capture interface and the electronic transaction device and between the data transfer interface and the computing device, including a wired connection, such as over a USB port, a wireless connection, such as a spread spectrum connection, a Blue-Tooth connection, or an 802.11 connection.

A system and method capturing transaction data has now been illustrated. It will be apparent to those skilled in the art that other variations of the present invention are possible without departing from the scope of the invention as disclosed. For example, one can envision that the invention can be used in association with mobile phone-based digital wallets, wherein both payment and receipt for a transaction are accomplished using IrDA or Bluetooth with the mobile phone handset. Likewise, the transaction data can be used in numerous applications, such as for tax preparation, expense reports, etc., as typically done by application such as Quicken from Intuit. Further, any reference to claim elements in the singular, for example, using the articles "a," "an," or "the" is not to be construed as limiting the element to the singular.

What is claimed is:

1. A transaction data capture system comprising:
   a data capture interface;
   a portable data capture module (herein, the "PDCM") comprising a memory; and
   a data transfer interface,
   wherein the data capture interface is linked to the PDCM and is adapted for:
      connecting to an electronic transaction device;
      receiving transaction data from the electronic transaction device;
      translating the transaction data into a format readable by the transfer interface; and
      storing the transaction data in the memory of the PDCM; and
   wherein the transfer interface is linked to the PDCM and is adapted for:
      connecting to a computing device;
      receiving a transfer command from a computing device;
      processing the transaction data for transfer to the computing device in response to the transfer command; and
      transferring the transaction data from the memory of the PDCM to the computing device.

2. The system of claim 1, wherein the electronic transaction device is selected from the group consisting of a cash register, a computer, a credit card transaction device, a debit card transaction device, a smart card transaction device, a bank teller terminal, and an automated teller machine (ATM).

3. The system of claim 1, wherein the PDCM is selected from the group consisting of flash memory cards, flash drives, portable hard drives, solid state disks, personal digital assistants (PDAs), portable gaming devices, mobile telephone devices, and mobile computers.

4. The system of claim 1, wherein the computing device is selected from the group consisting of a desktop computer, a tablet computer, a laptop computer, a personal data assistant, and a mobile telephone device.

5. The system of claim 1, wherein the transaction data is selected from the group consisting of a cash register transaction, a computer transaction, a credit card transaction, a debit card transaction, smart card transaction, and a banking transaction.

6. The system of claim 1, wherein the connection between the data capture interface and the electronic transaction device is established over a wired connection.

7. The system of claim 6, wherein the connection between the data capture interface and the electronic transaction device is established over a USB port.

8. The system of claim 1, wherein the connection between the data capture interface and the electronic transaction device is established over a wireless connection.

9. The system of claim 8, wherein the wireless connection is selected from the group consisting of a spread spectrum connection, a Blue-Tooth connection, and an 802.11 connection.

10. The system of claim 1, wherein the connection between the data transfer interface and the computing device is established over a wired connection.

11. The system of claim 10, wherein the connection between the data transfer interface and the computing device is established over a USB port.

12. The system of claim 1, wherein the connection between the data transfer interface and the computing device is established over a wireless connection.

13. The system of claim 12, wherein the wireless connection is selected from the group consisting of a spread spectrum connection, a Blue-Tooth connection, and an 802.11 connection.

14. The system of claim 1, wherein the data capture interface is integrated into the electronic transaction device.

15. The system of claim 1, wherein the data transfer interface is integrated into the computing device.

16. The system of claim 1, wherein the data capture interface and the data transfer interface are integrated into the PDCM.

17. A method of capturing transaction data from an electronic transaction device comprising:
- receiving transaction data from the electronic transaction device at a data capture interface;
- translating the transaction data into a format readable by a data transfer interface;
- storing the transaction data in a memory of a portable data capture module;
- receiving a transfer command from a computing device;
- processing the transaction data at the data transfer interface for transfer to the computing device in response to the transfer command; and
- transferring the processed transaction data from the memory of the PDCM to the computing device.

18. The method of capturing transaction data of claim 17, wherein the electronic transaction device is selected from the group consisting of a cash register, a computer, a credit card transaction device, a debit card transaction device, a smart card transaction device, a bank teller terminal, and an automated teller machine (ATM).

19. The method of capturing transaction data of claim 17, wherein the PDCM is selected from the group consisting of flash memory cards, flash drives, portable hard drives, solid state disks, personal digital assistants (PDAs), portable gaming devices, mobile telephone devices, and mobile computers.

20. The method of capturing transaction data of claim 17, wherein the computing device is selected from the group consisting of a desktop computer, a tablet computer, a laptop computer, a personal data assistant, and a mobile telephone device.

21. The method of capturing transaction data of claim 17, wherein the transaction data is selected from the group consisting of a cash register transaction, a computer transaction, a credit card transaction, a debit card transaction, a smart card transaction, and a banking transaction.

22. The method of capturing transaction data of claim 17, wherein the receiving transaction data from the electronic transaction device at the data capture interface comprises receiving transaction data from the electronic transaction device at the data capture interface via a wired connection.

23. The method of capturing transaction data of claim 22, wherein the wired connection is a USB port.

24. The method of capturing transaction data of claim 17, wherein the receiving transaction data from the electronic transaction device at the data capture interface comprises receiving transaction data from the electronic transaction device at the data capture interface via a wireless connection.

25. The method of capturing transaction data of claim 24, wherein the wireless connection is selected from the group consisting of a spread spectrum connection, a Blue-Tooth connection, and an 802.11 connection.

26. The method of capturing transaction data of claim 17, wherein the transferring the processed transaction data from the memory of the PDCM to the computing device comprises transferring the processed transaction data from the memory of the PDCM to the computing device via a wired connection.

27. The method of capturing transaction data of claim 26, wherein the wired connection is a USB port.

28. The method of capturing transaction data of claim 17, wherein the transferring the processed transaction data from the memory of the PDCM to the computing device comprises transferring the processed transaction data from the memory of the PDCM to the computing device via a wireless connection.

29. The method of capturing transaction data of claim 28, wherein the wireless connection is selected from the group consisting of a spread spectrum connection, a Blue-Tooth connection, and an 802.11 connection.

30. The method of claim 17, further comprising associating user demographic information with the PDCM and a party to the transaction associating transaction data with the demographic information based on the user PDCM.

* * * * *